United States Patent [19]
Matsumoto et al.

[11] Patent Number: 5,191,006
[45] Date of Patent: Mar. 2, 1993

[54] OXYMETHYLENE COPOLYMER COMPOSITION

[75] Inventors: Isamu Matsumoto; Zenpei Mizutani; Hiroshi Yada; Yoshihito Hara, all of Yokkaichi, Japan

[73] Assignee: Mitsubishi Gas Chemical Company, Inc., Tokyo, Japan

[21] Appl. No.: 719,491

[22] Filed: Jun. 24, 1991

[30] Foreign Application Priority Data

Feb. 7, 1990 [JP] Japan .................................. 2-172597

[51] Int. Cl.⁵ ............................................. C08K 5/11
[52] U.S. Cl. .................................... 524/310; 524/311; 524/313; 524/317; 524/400; 524/593
[58] Field of Search ............... 524/310, 313, 311, 317, 524/400, 593, 612

[56] References Cited

U.S. PATENT DOCUMENTS

| | | | |
|---|---|---|---|
| 3,484,399 | 12/1969 | Kakos | 524/399 |
| 3,808,133 | 4/1974 | Brown | 524/593 |
| 4,559,380 | 12/1985 | Kasuga et al. | 524/593 |
| 4,900,769 | 2/1990 | Kimura | 524/593 |

FOREIGN PATENT DOCUMENTS

0110108A2  6/1984  European Pat. Off. .

Primary Examiner—Veronica P. Hoke
Attorney, Agent, or Firm—Wenderoth, Lind & Ponack

[57] ABSTRACT

An oxymethylene copolymer composition which comprises an intimate mixture containing:
(A) 100 parts by weight of an oxymethylene copolymer,
(B) 0.01 to 2 parts by weight of an ester composed of a polyhydric alcohol having 2 to 10 carbon atoms and a higher fatty acid having 22 to 32 carbon atoms, and
(C) 0.01 to 3 parts by weight of an alkaline earth metal salt of a fatty acid having 12 to 35 carbon atoms.

6 Claims, No Drawings

OXYMETHYLENE COPOLYMER COMPOSITION

DETAILED DESCRIPTION OF THE INVENTION

The present invention relates to an oxymethylene copolymer composition. More specifically, the present invention relates to an oxymethylene copolymer composition which is excellent in thermal stability, does not cause discoloration during molding and involves little mold deposit.

It is known that an oxymethylene copolymer produced by copolymerizing formaldehyde or its cyclic oligomer such as trioxan or tetraoxan with a monomer copolymerizable therewith easily undergoes decomposition in the terminal of the copolymer molecule.

In order to produce a stable oxymethylene copolymer, it is conventional practice to treat the terminal molecule of an oxymethylene copolymer by various methods and mix and knead the so-treated oxymethylene copolymer with additives such as an antioxidant, a thermal stabilizer, a light stabilizer, etc.

Japanese Patent Publication No. 6099/1958 discloses a process for esterifying a high-molecular-weight copolymer of formaldehyde with a carboxylic anhydride, i.e. acylation, in order to improve the heat resistance of the copolymer.

Japanese Patent Publication No. 8815/1962 discloses a polyoxymethylene composition having a low apparent melt viscosity, and being formed of a polyoxymethylene which is stabilized in the terminal group and has a high polymerization degree and a saturated aliphatic alcohol having 12 to 30 carbon atoms.

Japanese Patent Publication No. 8816/1962 discloses a polyoxymethylene composition similarly having a low apparent melt viscosity, and being formed of a polyoxymethylene which is stabilized in the terminal group and has a high polymerization degree and a polyalkylene glycol.

Japanese Patent Publication No. 16174/1962 discloses an extruding or molding composition formed of a high-molecular-weight polyoxymethylene resin and a small amount of glycerin.

Japanese Patent Publication No. 8071/1964 discloses a process for stabilizing a polyoxymethylene polymer, which comprises heating the polyoxymethylene polymer to a temperature in the range between a temperature which is 50° C. lower than the melting point thereof and a temperature which is 60° C. higher than the melting point thereof to eliminate volatile components from the polymer.

Japanese Patent Publication No. 10435/1965 discloses a process for producing a thermally stabilized polyoxymethylene, which comprises heating a copolymer formed of either formaldehyde or trioxane and either a cyclic ether or a cyclic acetal to a temperature between 100° C. and 150° C. in an aqueous dispersion at pH of at least 8 in the presence of a compound reactive with formaldehyde such as an amine.

Japanese Patent Publication No. 10531/1972 discloses a polyacetal composition formed of a strontium or magnesium salt of polyoxymethylene and either a carboxylic acid having at least 6 carbon atoms or a substituted carboxylic acid having at least 6 carbon atoms.

Japanese Patent Publication No. 42085/1980 discloses a process which comprises polymerizing either trioxane or a combination of trioxane with a cyclic ether and/or a cyclic acetal in the presence of a specific catalyst and deactivating the catalyst with a trivalent organic phosphorus compound to terminate the polymerization. According to this publication, the trivalent organic phosphorus compound has no bad influence on the thermal stability of the polymer.

Japanese Laid-Open Patent Publication No. 128740/1982 discloses an acetal resin composition having little molding strain, which is formed of an acetal resin and both/or either polyalkylene glycol alkyl ether and/or polyglycerin fatty acid ester.

Japanese Patent Publication No. 4422/1987 discloses a thermally stabilized polyoxymethylene composition containing an oxymethylene copolymer, a polyamide and at least one member selected from (a) a fatty acid having 12 to 35 carbon atoms, (b) calcium salt of a fatty acid having 12 to 35 carbon atoms, and (c) calcium or magnesium salt of an aliphatic alcohol having 12 to 36 carbon atoms.

Japanese Laid-Open Patent Publication No. 295661/1988 discloses an acetal resin composition having highly improved mold releasability when injection-molded, which comprises 100 parts by weight of an acetal resin and either 0.01 to 2.0 parts by weight of an ester formed of a polyhydric alcohol having 2 to 10 carbon atoms, and a higher fatty acid having 22 to 32 carbon atoms or a combination of 0.01 to 2.0 parts by weight of this ester with 0.01 to 2.0 parts by weight of a linear higher fatty acid amide having at least 10 carbon atoms.

However, when these oxymethylene copolymer compositions produced by the above processes are taken from the aspect of a molding material, there are found various points which remain to further improve.

Oxymethylene copolymers are often used as a material for small-sized molded articles used as a mechanism element such as a gear, a bearing, a pulley, etc. However, when the oxymethylene copolymer composition produced by any of the above processes is used as a molding material for such a mechanism element, the following problem is observed. That is, when the capacity of a molding machine is relatively high, the retention time of the molding material in the molding machine is sometimes too long to avoid the initiation of the decomposition of the molding material, and undesirable phenomena such as decomposition, foaming, etc., of the material occur in the cylinder, which finally results in the production of defective molded articles.

There is another problem in that some stabilizers cause a color change towards yellow on conventional oxymethylene copolymer compositions as a molding material during the residence in the cylinder of a molding machine, which change towards yellow impairs the value of the resultant molded article.

Further, oxymethylene copolymer compositions are used as a molding material for molded articles of which highly dimensional accuracy is required such as a pulley, a gear, etc., as described above. However, when conventional oxymethylene copolymer compositions are subjected to a continuous injection molding method taking a long period of time, a mold deposit occurs, which is considered to occur due to formaldehyde gas generated by thermal decomposition. There are therefore problems in that not only a molded article such as a gear, etc., is out of dimensional tolerance, but also the surface state of the molded article is impaired.

It is an object of the present invention to provide a novel oxymethylene copolymer composition.

It is another object of the present invention to provide an oxymethylene copolymer composition having excellent performances as a molding material.

It is still another object of the present invention to provide an oxymethylene copolymer composition having excellent thermal stability, which particularly permits prevention or inhibition of decomposition, a color change towards yellow and foaming even when held in a molten state for a long period of time.

The above objects and other objects and advantages of the present invention will be apparent from the following description.

According to the present invention, the above objects and advantages of the present invention are achieved by an oxymethylene copolymer composition which comprises an intimate mixture containing;

(A) 100 parts by weight of an oxymethylene copolymer,
(B) 0.01 to 2 parts by weight of an ester composed of a polyhydric alcohol having 2 to 10 carbon atoms and a higher fatty acid having 22 to 32 carbon atoms, and
(C) 0.01 to 3 parts by weight of an alkaline earth metal salt of a fatty acid having 12 to 35 carbon atoms.

The composition of the present invention contains the above three components (A), (B) and (C) as essential components.

In a composition consisting of the oxymethylene copolymer (A) and the ester (B) alone, it is difficult to sufficiently stabilize the oxymethylene copolymer, and such a composition is not so thermally stabilized that it can be subjected to actual injection molding.

On the other hand, in an oxymethylene copolymer composition obtained by stabilizing an oxymethylene copolymer with the alkaline earth metal salt of a fatty acid (C) alone, such a composition is easily decomposed and foamed for a relatively short period of time when held in a molten state in the cylinder of a molding machine. Moreover, a mold deposit is observed even when the number of shots is small in the continuous molding of such a composition with a molding machine. The oxymethylene copolymer composition having very high thermal stability, which is an object of the present invention, can be obtained by incorporating both the specified amount of the polyhydric alcohol fatty acid ester (B) and the specified amount of the alkaline earth metal salt of a fatty acid (C) into an oxymethylene copolymer.

The polyoxymethylene copolymer (A) used in the present invention can be obtained by copolymerizing formaldehyde or its cyclic oligomer such as trioxan, tetraoxan, etc., with a cyclic ether or cyclic acetal such as ethylene oxide, propylene oxide, epichlorohydrin, 1,3-dioxolane, 1,3-dioxepane, formal of glycol, etc., in the presence of a catalyst. The polyoxymethylene copolymer (A) preferably has 0.4 to 40 mol %, particularly preferably 0.4 to 10 mol % of oxyalkylene units having at least two carbon atoms in the oxymethylene main chain. The polyoxymethylene copolymer (A) may optionally be a copolymer obtained by subjecting a crude copolymer to stabilization treatment in which the unstable portion thereof is decomposed under a molten state.

As a catalyst for the above copolymerization, conventional cationic polymerization catalysts can be used. Particularly preferred are compounds containing boron fluoride, which are used as hydrates and coordination complexes. In particular, as a catalyst, preferred is a boron trifluoride diethyl etherate which is a coordination complex with ethers.

The oxymethylene copolymer obtained by the above copolymerization may be subjected to the catalyst removal treatment according to a conventional method, or the catalyst deactivation treatment in which a trivalent organic phosphorus compound is added as described in Japanese Patent Publication No. 42085/1980.

When the oxymethylene copolymer is subjected to the latter treatment using a reaction terminator, the polymerization catalyst is deactivated and the polymerization is terminated. Furthermore, this treatment has the following advantages. Even if the deactivated catalyst remains in the copolymer, the catalyst has no bad influence on the thermal stability of the copolymer, and no further washing treatment is required. Moreover, the stabilizing agent system used in the present invention particularly effectively works to stabilize the oxymethylene copolymer treated with an organic phosphorus compound.

The polyhydric alcohol fatty acid ester (B) used in the present invention refers to a compound having at least one ester group and being derived from a polyhydric alcohol having 2 to 10 carbon atoms and a higher fatty acid having 22 to 32 carbon atoms.

The above polyhydric alcohol is preferably selected, for example, from glycerin, diglycerin, pentaerythritol, sorbitan, ethylene glycol, diethylene glycol, trimethylolmethane, triethylolmethane, etc.

The above higher fatty acid is preferably selected, for example, from behenic acid, cerotic acid, montanic acid, lacceric acid, etc.

The alkaline earth metal salt of a fatty acid having 12 to 35 carbon atoms (C), used in the present invention, refers to an alkaline earth metal salt of a saturated or unsaturated fatty acid having 12 to 35 carbon atoms. The metal salt (C) is preferably selected, for example, from magnesium, calcium, barium and strontium salts of fatty acids such as lauric acid, palmitic acid, stearic acid, behenic acid, montanic acid, 12-hydroxystearic acid, oleic acid, erucic acid, and the like.

Per 100 parts by weight of the oxymethylene copolymer (A), the amount of the polyhydric alcohol fatty acid ester (B) for use is 0.01 to 2.0 parts by weight, preferably 0.01 to 1.0 part by weight, and the amount of the alkaline earth metal salt of the fatty acid (C) for use is 0.01 to 3 parts by weight, preferably 0.01 to 2.0 parts by weight. When the amount of the polyhydric alcohol fatty acid ester (B) is out of the above range concerned or when that of the alkaline earth metal salt of the fatty acid (C) is out of the above range concerned, the following defects are undesirably caused: deterioration in appearance of a molded article such as defective color tone and silver streaks, dimensional failure due to replication of a mold contamination substance such as a mold deposit to a molded article, and surface roughening.

The composition of the present invention may contain a filler such as talc, titanium oxide, powdered mica, etc.; a reinforcing material such as carbon fibers, glass fibers, etc.; a colorant; a lubricant to provide mold releasability; and an additive such as an antistatic agent, etc., as required in such an amount that the effects of the present invention are not impaired.

Further, the composition of the present invention may contain a formaldehyde catcher and an antioxidant as a stabilization aid. The use of these is preferable since the composition exhibits better properties with regard to the thermal stability when molded, the long-term thermal stability of a molded article, and the like. The formaldehyde catcher is selected, for example, from urethane compounds, pyridine derivatives, pyrrolidone derivatives, urea derivatives, amine-substituted triazines, precondensates of amine-substituted triazines with formaldehyde, amide compounds, etc. Examples of the formaldehyde catcher which are particularly preferred for use in combination with the composition of the present invention are melamine, acetoguanamine, benzoguanamine, N-butylmelamine, N,N-diallylmelamine, N,N',N'-trimethylolmelamine, a nylon 6/6. 6/6.10 terpolymer, nylon 6/6.6/6.10/12 quadripolymer, dimer acid-containing polyamide, etc.

The amount of the formaldehyde catcher for use per 100 parts by weight of the oxymethylene copolymer is preferably 0.01 to 7 parts by weight, more preferably 0.02 to 5 parts by weight. When this amount is less than the above lower limit, no effect of the addition is produced. When it exceeds the above upper limit, the appearance of a molded article formed by continuous injection molding is undesirably deteriorated.

The antioxidant is selected from known substances which are used in oxymethylene copolymers. Preferred are triethylene glycol bis[3-(3-tert-butyl-4-hydroxy-5-methylphenyl)propionate] (Irganox 245, supplied by Ciba Geigy, Ltd), 2,2'-thiodiethylenebis[3-(3,5-di-tert-butyl-4-hydroxyphenyl)propionate] (Irganox 1035, supplied by Ciba Geigy, Ltd), 1,6-hexanediol-bis[3-(3,5-di-tert-butyl-4-hydroxyphenyl)propionate] (Irganox 259, supplied by Ciba Geigy, Ltd), pentaerithrityl-tetrakis[3-(3,5-di-tert-butyl-4-hydroxyphenyl)propionate] (Irganox 1010, supplied by Ciba Geigy Ltd.), etc.

The amount of the antioxidant for use per 100 parts by weight of the oxymethylene copolymer is preferably 0.03 to 5 parts by weight, more preferably 0.05 to 3 parts by weight. An amount out of the above range is undesirable for the same reasons described with regard to the formaldehyde catcher.

When the oxymethylene copolymer composition of the present invention is subjected to long-term continuous injection molding, the degree of occurrence of a mold contamination substance (mold deposit) is remarkably low. Even when it is held in a molten state at a relatively high temperature in the cylinder of a molding machine, failures such as foaming, color change, etc., are never observed. Thus, the oxymethylene copolymer composition of the present invention has high stability.

The present invention will be illustrated more specifically hereinafter by references to Examples and Comparative Examples, in which the intrinsic viscosity shows a value obtained by measurement in p-chlorophenol containing 2% by weight of α-pinene at 60° C., and the unit "phr" for the amount of a stabilizer shows part by weight per 100 parts by weight of an oxymethylene copolymer.

EXAMPLE 1

Trioxan was charged into a kneader having two sigma-shaped agitating blades, and melted by heating it to 60° C. Added to the trioxan were 2.5% by weight, based on the trioxan, of ethylene oxide and 0.010 mol %, based on the trioxan, of boron fluoride diethyl etherate, and these components were polymerized with stirring to prepare a crude oxymethylene copolymer at a yield of 98%.

The crude oxymethylene copolymer had an intrinsic viscosity of 1.45 dl/g. Triphenyl phosphine which was twice as much as the catalyst by mole was added to this copolymer to deactivate the catalyst.

Then, 0.1 phr of calcium stearate and 0.15 phr of behenic acid monoglyceride (Exeparl G-MB, supplied by Kao Corporation) were added to the crude oxymethylene copolymer, and these components were mixed with a Henschel mixer at 1,500 rpm for about 3 minutes. The resultant mixture was melted in a twin-screw extruder having an L/D of 27 and a vent measuring 32 mm in diameter to stabilize the copolymer. For this stabilization, the average retention time of the mixture of the oxymethylene copolymer in the twin-screw extruder was about 15 minutes. The resultant oxymethylene copolymer composition stabilized was extruded through a die head of the twin-screw extruder to form a strand, and the strand was immediately pelletized by means of a pelletizer. The stabilized oxymethylene copolymer composition was tested for the following properties, and the results are shown in Table 1. The tests were carried out as follows.

(1) Tensile strength, tensile elongation:
Measured according to the method described in ASTM-D638.

(2) Retention thermal stability (retention time before silver streaks start to appear on molded article):
Injection molding machine: SJ-35A supplied by Meiki Seisakusho.
Retention conditions:
 Cylinder temperature   240° C.,
 Retention time   60 minutes at maximum.
Evaluation method: A resin of which the amount was sufficient for six shots was allowed to reside in the injection molding machine, and injection-molded every 10 minutes to determine a time before silver streaks start to appear on molded article (e.g. when silver streaks occurred in a third shot, the retention time was taken as 30 minutes).

(3) Change in color tone during retention:
Color-difference meter:
 Hunter color-difference meter supplied by Suga Shikenki K.K.
Injection molding machine:
 SJ-35A supplied by Meiki Seisakusho.
Retention conditions:
 Cylinder temperature   240° C.
 Retention time   20 minutes.
Molded article color tone at retention time (1 min.):

$L_1, A_1, b_1$

Molded article color tone at retention time (20 min.):

$L_2, a_2, b_2$

Calculation method:

$$\Delta E = \sqrt{(L_2 - L_1)^2 + (a_2 - a_1)^2 + (b_2 - b_1)^2}$$

Evaluation ratings:
◎: $0 < \Delta E < 4$
○: $4 < \Delta E < 6$
△: $6 < \Delta E < 8$
X: $8 < \Delta E < 10$ (4) Mold deposit:
Injection molding machine:
  IS-75 supplied by Toshiba Corp.
Test method: Continuous injection molding was carried out at a material temperature of about 220° C., at a mold temperature of 70° C. and at molding cycle of about 15 seconds, and the number of shots were counted until a mold deposit occurred on the mold.

EXAMPLE 2

Example 1 was repeated except that the amount of calcium stearate was changed from 0.1 phr to 0.2 phr and that 0.10 phr of sorbitan monobehenate was used in place of 0.15 phr of the behenic acid monoglyceride, whereby a stabilized oxymethylene copolymer composition was obtained. This composition was tested in the same manner as in Example 1. Table 1 shows the results.

EXAMPLE 3

Example 1 was repeated except that the amount of calcium stearate was changed from 0.1 phr to 0.05 phr and that 0.05 phr of cerotic acid monoglyceride was used in place of 0.15 phr of the behenic acid monoglyceride, whereby a stabilized oxymethylene copolymer composition was obtained. This composition was tested in the same manner as in Example 1. Table 1 shows the results.

EXAMPLE 4

Example 1 was repeated except that 0.10 phr of the calcium stearate and 0.15 phr of the behenic acid monoglyceride were replaced with 0.10 phr of magnesium stearate and 0.15 phr of behenic acid monoglyceride, whereby a stabilized oxymethylene copolymer composition was obtained. This composition was tested in the same manner as in Example 1. Table 1 shows the results.

EXAMPLE 5

Example 1 was repeated except that 0.10 phr of the calcium stearate and 0.15 phr of the behenic acid monoglyceride were replaced with 0.10 phr of magnesium stearate and 0.10 phr of sorbitan erucic acid mono-ester, whereby a stabilized oxymethylene copolymer composition was obtained. This composition was tested in the same manner as in Example 1. Table 1 shows the results.

EXAMPLE 6

Example 1 was repeated except that 0.10 phr of the calcium stearate and 0.15 phr of the behenic acid monoglyceride were replaced with 0.10 phr of calcium 12-hydroxystearate and 0.10 phr of behenic acid monoglyceride, whereby a stabilized oxymethylene copolymer composition was obtained. This composition was tested in the same manner as in Example 1. Table 1 shows the results.

EXAMPLE 7

Example 1 was repeated except that 0.10 phr of the calcium stearate and 0.15 phr of the behenic acid monoglyceride were replaced with 0.15 phr of calcium 12-hydroxystearate and 0.05 phr of lacceric acid monoglyceride, whereby a stabilized oxymethylene copolymer composition was obtained. This composition was tested in the same manner as in Example 1. Table 1 shows the results.

EXAMPLE 8

Example 1 was repeated except that 0.10 phr of the calcium stearate and 0.15 phr of the behenic acid monoglyceride were replaced with 0.20 phr of calcium behenate and 0.20 phr of behenic acid monoglyceride, whereby a stabilized oxymethylene copolymer composition was obtained. This composition was tested in the same manner as in Example 1. Table 1 shows the results.

EXAMPLE 9

Example 1 was repeated except that 0.10 phr of the calcium stearate and 0.15 phr of the behenic acid monoglyceride were replaced with 0.10 phr of calcium laurate and 0.15 phr of behenic acid monoglyceride, whereby a stabilized oxymethylene copolymer composition was obtained. This composition was tested in the same manner as in Example 1. Table 1 shows the results.

EXAMPLE 10

Example 1 was repeated except that 0.10 phr of the calcium stearate and 0.15 phr of the behenic acid monoglyceride were replaced with 0.05 phr of calcium montanate and 0.05 phr of behenic acid monoglyceride, whereby a stabilized oxymethylene copolymer composition was obtained. This composition was tested in the same manner as in Example 1. Table 1 shows the results.

EXAMPLE 11

Example 1 was repeated except that 0.10 phr of the calcium stearate and 0.15 phr of the behenic acid monoglyceride were replaced with 0.10 phr of calcium salt of dimer acid and 0.15 phr of behenic acid monoglyceride, whereby a stabilized oxymethylene copolymer composition was obtained. This composition was tested in the same manner as in Example 1. Table 1 shows the results.

EXAMPLE 12

Trioxan and 3.5% by weight, based on the trioxan, of 1,3-dioxepane and 0.013 mol %, based on the trioxan, of boron fluoride diethyl etherate were polymerized in the same manner as in Example 1 to give a crude oxymethylene copolymer. The crude oxymethylene copolymer had an intrinsic viscosity of 1.48 dl/g Triphenylphosphine which was twice as much as the catalyst by mole was added to deactivate the catalyst.

In the same manner as in Example 1, 0.10 phr of calcium stearate and 0.15 phr of behenic acid monoglyceride were added to the crude oxymethylene copolymer, these components were mixed with a Henschel mixer, and the resultant mixture was stabilized in a twin-screw extruder to give a stabilized oxymethylene copolymer composition. The oxymethylene copolymer composition was tested in the same manner as in Example 1. Table 1 shows the results.

EXAMPLE 13

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.10 phr of behenic acid monoglyceride, 0.20 phr of dimethylolmelamine and 0.60 phr of pentaerythrityl-tetrakis[3-(3,5-di-tert-butyl-4-hydroxyphenyl)propionate] (Irganox-1010, supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The resultant oxymethylene copolymer composition was tested in the same manner as in Example 1. Table 1 shows the results.

EXAMPLE 14

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.10 phr of behenic acid monoglyceride, 0.10 phr of melamine and 0.50 phr of Irganox-1010 (supplied by Ciba Geigy, Ltd.) were added to the crude oxymethylene copolymer, and these components were mixed with a Henschel mixer and kneaded in a twin screw extruder for the stabilization in the same manner as in Example 1 to give a stabilized oxymethylene copolymer composition. The oxymethylene copolymer composition was tested in the same manner as in Example 1. Table 1 shows the results.

EXAMPLE 15

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.15 phr of behenic acid monoglyceride, 0.20 phr of melamine and 0.50 phr of 1,6-hexanediol-bis[3-(3,5-di-tert-butyl-4-hydroxyphenyl)propionate] (Irganox-259, supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The oxymethylene copolymer composition was tested in the same manner as in Example 1. Table 1 shows the results.

EXAMPLE 16

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.15 phr of behenic acid monoglyceride, 0.20 phr of melamine and 0.50 phr of triethylene glycol-bis[3-(3,5-di-tert-butyl-4-hydroxyphenyl)-propionate] (Irganox-245, supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The oxymethylene copolymer composition was tested in the same manner as in Example 1. Table 1 shows the results.

EXAMPLE 17

Added to the crude oxymethylene copolymer obtained in Example 1 was triphenyl phosphine which was twice, by mole, as much as the catalyst used for the polymerization to deactivate the catalyst. Then, 0.10 phr of calcium strearate, 0.10 phr of sorbitan monobehenate, 0.20 phr of benzoguanamine and 0.50 phr of Irganox-1010 (supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The resultant oxymethylene copolymer composition was tested in the same manner as in Example 1. Table 1 shows the same manner as in Example 1. Table 1 shows the results.

EXAMPLE 18

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.15 phr of behenic acid monoglyceride, 0.20 phr of dimer acid polyamide and 0.50 phr of Irganox-245 (supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The resultant oxymethylene copolymer composition was tested in the same manner as in Example 1. Table 1 shows the results.

EXAMPLE 19

Added to the crude oxymethylene copolymer obtained in Example 1 was triphenyl phosphine which was twice, by mole, as much as the catalyst used for the polymerization to deactivate the catalyst. Then, 0.10 phr of calcium stearate, 0.10 phr of behenic acid monoglyceride, 0.10 phr of melamine and 0.50 phr of Irganox-1010 (supplied by Ciba Geigy, Ltd.) were added to the crude oxymethylene copolymer, and these components were mixed with a Henschel mixer and kneaded in a twin-screw extruder for the stabilization in the same manner as in Example 1 to give a stabilized oxymethylene copolymer composition. The resultant oxymethylene copolymer composition was tested in the same manner as in Example 1. Table 1 shows the results.

TABLE 1

| | Tensile strength ($kg/cm^2$) | Tensile elongation (%) | Retention thermal stability — Retention time before silver streaks start to appear on molded articles (min.) | Change in color tone | Number of shots up to occurrence of mold deposit (shots) |
|---|---|---|---|---|---|
| Example 1 | 630 | 55 | 40 | ⓒ | 4000 |
| Example 2 | 625 | 60 | 40 | ⓒ | 4000 |
| Example 3 | 630 | 55 | 30 | ⓒ | 4000 |
| Example 4 | 630 | 55 | 40 | ⓒ | 4000 |
| Example 5 | 630 | 55 | 40 | ⓒ | 4000 |
| Example 6 | 630 | 55 | 40 | ⓒ | 4000 |
| Example 7 | 630 | 55 | 40 | ⓒ | 4000 |
| Example 8 | 625 | 60 | 40 | ⓒ | 4000 |
| Example 9 | 630 | 55 | 40 | ⓒ | 4000 |
| Example 10 | 630 | 50 | 30 | ⓒ | 3500 |

TABLE 1-continued

|  | Tensile strength (kg/cm²) | Tensile elongation (%) | Retention thermal stability | | Number of shots up to occurrence of mold deposit (shots) |
|---|---|---|---|---|---|
|  |  |  | Retention time before silver streaks start to appear on molded articles (min.) | Change in color tone |  |
| Example 11 | 630 | 55 | 40 | ⊙ | 4000 |
| Example 12 | 620 | 55 | 40 | ⊙ | 4000 |
| Example 13 | 630 | 55 | 60< | ⊙ | 6000< |
| Example 14 | 630 | 55 | 60< | ⊙ | 6000< |
| Example 15 | 630 | 55 | 60< | ⊙ | 6000< |
| Example 16 | 630 | 55 | 60< | ⊙ | 6000< |
| Example 17 | 630 | 55 | 60< | ⊙ | 6000< |
| Example 18 | 630 | 55 | 60< | ⊙ | 6000< |
| Example 19 | 620 | 55 | 60< | ⊙ | 6000< |

COMPARATIVE EXAMPLE 1

Example 1 was repeated except that 0.10 phr of the calcium stearate and 0.15 phr of the behenic acid monoglyceride were replaced with 0.10 phr of calcium stearate alone, whereby a stabilized oxymethylene copolymer composition was obtained. This composition was tested in the same manner as in Example 1. Table 2 shows the results.

COMPARATIVE EXAMPLE 2

Example 1 was repeated except that 0.10 phr of the calcium stearate and 0.15 phr of the behenic acid monoglyceride were replaced with 0.20 phr of magnesium stearate alone, whereby a stabilized oxymethylene copolymer composition was obtained. This composition was tested in the same manner as in Example 1. Table 2 shows the results.

COMPARATIVE EXAMPLE 3

Example 1 was repeated except that 0.10 phr of the calcium stearate and 0.15 phr of the behenic acid monoglyceride were replaced with 0.40 phr of calcium 12-hydroxystearate alone, whereby a stabilized oxymethylene copolymer composition was obtained. This composition was tested in the same manner as in Example 1. Table 2 shows the results.

COMPARATIVE EXAMPLE 4

The stabilization of an oxymethylene copolymer was attempted by repeating Example 1 except that 0.10 phr of the calcium stearate and 0.15 phr of the behenic acid monoglyceride were replaced with 0.20 phr of behenic acid monoglyceride alone. However, foaming of strands, which was considered to be caused by the decomposition of the resin, was observed, and no pellet of stabilized oxymethylene copolymer composition could be obtained.

COMPARATIVE EXAMPLE 5

The stabilization of an oxymethylene copolymer was attempted by repeating Example 1 except that 0.10 phr of the calcium stearate and 0.15 phr of the behenic acid monoglyceride were replaced with 0.20 phr of lacceric acid monoglyceride alone. However, foaming of strands, which was considered to be caused by the decomposition of the resin, was observed, and no pellet of a stabilized oxymethylene copolymer composition could be obtained.

COMPARATIVE EXAMPLE 6

The stabilization of an oxymethylene copolymer was attempted by repeating Example 1 except that 0.10 phr of the calcium stearate and 0.15 phr of the behenic acid monoglyceride were replaced with 0.30 phr of sorbitan monobehenate alone. However, foaming of strands, which was considered to be caused by the decomposition of the resin, was observed, and no pellet of a stabilized oxymethylene copolymer composition could be obtained.

COMPARATIVE EXAMPLE 7

Example 12 was repeated except that 0.10 phr of the calcium stearate and 0.15 phr of the behenic acid monoglyceride were replaced with 0.20 phr of calcium stearate alone, whereby a stabilized oxymethylene copolymer composition was obtained. This composition was tested in the same manner as in Example 1. Table 2 shows the results.

COMPARATIVE EXAMPLE 8

The stabilization of an oxymethylene copolymer was attempted by repeating Example 12 except that 0.10 phr of the calcium stearate and 0.15 phr of the behenic acid monoglyceride were replaced with 0.20 phr of behenic acid monoglyceride alone. However, foaming of strands, which was considered to be caused by the decomposition of the resin, was observed, and no pellet of a stabilized oxymethylene copolymer composition could be obtained.

TABLE 2

|  | Tensile strength (kg/cm²) | Tensile elongation (%) | Retention thermal stability | | Number of shots up to occurrence of mold deposit (shots) |
|---|---|---|---|---|---|
|  |  |  | Retention time before silver streaks start to appear on molded articles (min.) | Change in color tone |  |
| Comparative Example 1 | 630 | 35 | 20 | * | 300 |
| Comparative | 630 | 40 | 20 | * | 500 |

TABLE 2-continued

| | Tensile strength (kg/cm²) | Tensile elongation (%) | Retention thermal stability | | Number of shots up to occurrence of mold deposit (shots) |
| --- | --- | --- | --- | --- | --- |
| | | | Retention time before silver streaks start to appear on molded articles (min.) | Change in color tone | |
| Example 2 Comparative Example 3 | 630 | 45 | 20 | * | 400 |
| Comparative Example 4 | Foamed at stabilization time, and no pellet was obtained. | | | | |
| Comparative Example 5 | | | " | | |
| Comparative Example 6 | | | " | | |
| Comparative Example 7 | 620 | 45 | 20 | * | 500 |
| Comparative Example 8 | Foamed at stabilization time, and no pellet was obtained. | | | | |

(Note)*Not measurable due to extraordinary silver streaks

What is claimed is:

1. An oxymethylene copolymer composition which is an intimate mixture consisting essentially of:
   (A) 100 parts by weight of an oxymethylene copolymer,
   (B) 0.01 to 2 parts by weight of an ester composed of a polyhydric alcohol having 2 to 10 carbon atoms and a higher fatty acid having 22 to 32 carbon atoms, and
   (C) 0.01 to 3 parts by weight of an alkaline earth metal salt of a fatty acid having 12 to 35 carbon atoms.

2. The composition of claim 1, wherein the oxymethylene copolymer is a copolymer of either formaldehyde or a cyclic oligomer thereof and either a cyclic ether or a cyclic acetal.

3. The composition of claim 1, wherein the oxymethylene copolymer contains 0.4 to 40 mol % of oxyalkylene units having at least 2 carbon atoms in the main chain.

4. The composition of claim 1, wherein the amount of the ester composed of a polyhydric alcohol having 2 to 10 carbon atoms and a higher fatty acid having 22 to 32 carbon atoms is 0.01 to 1 by weight.

5. The composition of claim 1, wherein the amount of the alkaline earth metal salt of a fatty acid having 12 to 35 carbon atoms is 0.01 to 2 parts by weight.

6. The composition of claim 1, which further consisting essentially of a formaldehyde collector and/or an antioxidant.

* * * * *